(12) United States Patent
Kim et al.

(10) Patent No.: US 9,930,152 B2
(45) Date of Patent: Mar. 27, 2018

(54) MOBILE TERMINAL

(71) Applicant: LG ELECTRONICS INC., Seoul (KR)

(72) Inventors: Woojin Kim, Seoul (KR); Sungpil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/404,176

(22) Filed: Jan. 11, 2017

(65) Prior Publication Data

US 2017/0208157 A1    Jul. 20, 2017

(30) Foreign Application Priority Data

Jan. 18, 2016 (KR) .................. 10-2016-0006125

(51) Int. Cl.
*H04M 1/00* (2006.01)
*H04M 1/02* (2006.01)

(52) U.S. Cl.
CPC ....... *H04M 1/0206* (2013.01); *H04M 1/0249* (2013.01)

(58) Field of Classification Search
CPC ............. H04M 1/0206; H04M 1/0214; H04M 1/0216; H04M 1/0243; H04M 1/0247; H04M 1/0249; H04M 1/0254; H04M 1/0266; H04M 1/0268
USPC .......................... 455/90.3, 566, 575.1, 575.3
See application file for complete search history.

(56) References Cited

U.S. PATENT DOCUMENTS

| 7,016,492 | B2 * | 3/2006 | Pan ...................... H04M 1/0216 455/575.3 |
| 7,178,223 | B2 * | 2/2007 | Mitsuoka ........... H01H 13/7006 455/575.3 |
| 8,606,340 | B2 * | 12/2013 | Pegg ................... H04M 1/0247 455/575.4 |
| 2010/0232100 | A1 | 9/2010 | Fukuma et al. |

FOREIGN PATENT DOCUMENTS

| KR | 10-2012-0094676 | 8/2012 |
| KR | 10-2014-0091275 | 7/2014 |
| KR | 10-2015-0059484 | 6/2015 |
| KR | 10-2015-0135731 | 12/2015 |

OTHER PUBLICATIONS

International Application No. PCT/KR2016/002570, Search Report dated Sep. 30, 2016, 12 pages.

* cited by examiner

*Primary Examiner* — Quochien B Vuong
(74) *Attorney, Agent, or Firm* — Lee, Hong, Degerman, Kang & Waimey

(57) ABSTRACT

A mobile terminal includes first and second bodies, and a folding unit connecting the first and second bodies and disposed to be foldable, wherein the folding unit includes a plurality of sequentially disposed blocks; and a plurality of magnets installed in the plurality of blocks respectively, to generate a magnetic force when the folding unit is folded or unfolded.

15 Claims, 19 Drawing Sheets

MOBILE TERMINAL

CROSS-REFERENCE TO RELATED APPLICATION

Pursuant to 35 U.S.C. § 119(a), this application claims the benefit of earlier filing date and right of priority to Korean Application No. 10-2016-0006125, filed on Jan. 18, 2016, the contents of which are incorporated by reference herein in its entirety.

BACKGROUND OF THE INVENTION

1. Field of the Invention

The present disclosure relates to a foldable mobile terminal.

2. Background of the Invention

Terminals may be generally classified as mobile/portable terminals or stationary terminals according to their mobility. Mobile terminals may also be classified as handheld terminals or vehicle mounted terminals according to whether or not a user can directly carry along the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Terminals have evolved toward various designs, and in order to meet user demand for various designs, efforts to develop terminals having novel forms have been made. A novel form includes a structural alteration and improvement allowing users to more conveniently use terminals. A terminal in which a display unit is bendable or foldable in at least a portion thereof has come into prominence, as one of the structural alteration and improvement.

As display units which are bendable or foldable in at least a portion thereof have come to prominence, a mechanism for folding and unfolding a main body of a terminal together with a display unit may be considered.

SUMMARY OF THE INVENTION

The present disclosure has been made to solve the above-mentioned problems occurring in the prior art and other problems.

Another aspect of the detailed description is to provide a mobile terminal having a new type of body using characteristics of a bendable or fordable display unit.

Another aspect of the detailed description is to implement a new form factor allowing for folding and unfolding such that a terminal may be unfolded and folded to be used like a book.

Another aspect of the detailed description is to provide a mobile terminal in which a body may be easily switched between a folded state and an unfolded state.

To achieve these and other advantages and in accordance with the purpose of this specification, as embodied and broadly described herein, a mobile terminal includes: first and second bodies; and a folding unit connecting the first and second bodies and disposed to be foldable, wherein the folding unit includes a plurality of sequentially disposed blocks; and a plurality of magnets installed in the plurality of blocks respectively, to generate a magnetic force when the folding unit is folded or unfolded.

In an embodiment, each of the plurality of blocks may have first and second portions formed in a thickness direction and positioned on an inner side and outer side when the folding unit is folded, and the plurality of magnets apply attraction in a direction in which spaces between the second portions are narrowed when the folding unit is unfolded.

In an embodiment, each of the first and second portions may have a side surface having a different slope with respect to one surface of each of the first and second bodies.

In an embodiment, the plurality of magnets may be disposed to be slanted toward the second portion within the plurality of blocks.

In an embodiment, the plurality of magnets may include first magnets installed in the first portions to apply attraction in a direction in which the spaces between the first portions are narrowed when the folding unit is folded; and second magnets installed in the second portions to apply attraction in a direction in which spaces between the second portions are narrowed when the folding unit is unfolded.

In an embodiment, the mobile terminal may further include: a sensing unit sensing whether the folding unit is folded, wherein the first and second magnets may be configured as electromagnets, and when the sensing unit senses that the folding unit is folded or unfolded by the folding unit, current may flow in any one of the first and second magnets and current does not flow in the other.

In an embodiment, in order to maintain an intermediate state in which the first and second bodies are at a preset angle, a plurality of auxiliary magnets disposed to be aligned in the intermediate state may be installed in at least some of the plurality of blocks.

In an embodiment, the plurality of auxiliary magnets may be disposed in a different direction parallel to one direction in which the plurality of magnets are arranged.

In an embodiment, the mobile terminal may further include: a sensing unit sensing a posture of the first and second bodies, wherein the plurality of auxiliary magnets may be configured as electromagnets, and when the sensing unit senses that the first and second bodies are placed in the intermediate state, current may flow in the plurality of auxiliary magnets.

In an embodiment, a magnitude of a magnetic force formed between the plurality of auxiliary magnets may be greater than a magnitude of a magnetic force formed between the plurality of magnets.

To achieve these and other advantages and in accordance with the purpose of this specification, as embodied and broadly described herein, a mobile terminal includes: a main body having at least a portion formed to be flexible such that a state thereof is switched between an unfolded first state and a folded second state; and a folding unit installed in the main body and folding or unfolding the main body, wherein the folding unit includes: an elastic unit formed to have a plate form and installed in the main body so as to be folded together with the main body to generate a restoring force; a first magnetic force member installed at one end of the elastic unit; and a second magnetic force member installed in the main body to generate a magnetic force with the first magnetic force member when the main body is switched from the first state to the second state.

In an embodiment, one end of the elastic unit may be configured as a free end such that a position thereof with respect to the main body is changed when the state is switched between the first and second states, and the other end of the elastic unit may be disposed on the opposite side of the one end with respect to a folded portion of the main body and fixed to a specific position of the main body.

In an embodiment, the main body may include a plurality of blocks forming a folded region of the main body, each of the plurality of blocks may have first and second portions disposed in a thickness direction of the main body, and any one of the first and second portions may be formed such that a space therebetween is narrowed when the first state is switched to the second state, and the other may be formed such that a space therebetween is narrowed when the second state is switched to the first state.

In an embodiment, the elastic unit may be disposed on the main body to penetrate through the first portions of the plurality of blocks.

In an embodiment, the second magnetic force member may be configured to be movable between a first position adjacent to one end of the main body and a second position distant from the one end of the main body than the first position.

In an embodiment, the second magnetic force member may be installed in a linear motor so as to be linearly movable, and the mobile terminal may further include: a controller controlling the linear motor such that the second magnetic force member is moved to the second position when a user request for maintaining the main body at a preset angle is input in a state in which the second magnetic force member is placed in the first position.

In an embodiment, when a user request for switching the main body to the second state is input, the controller may control the linear motor such that the second magnetic force member is moved to the first position.

In an embodiment, at least a pair of magnets applying attraction to the main body to maintain the main body in the second state may be installed at both ends of one surface of the main body.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
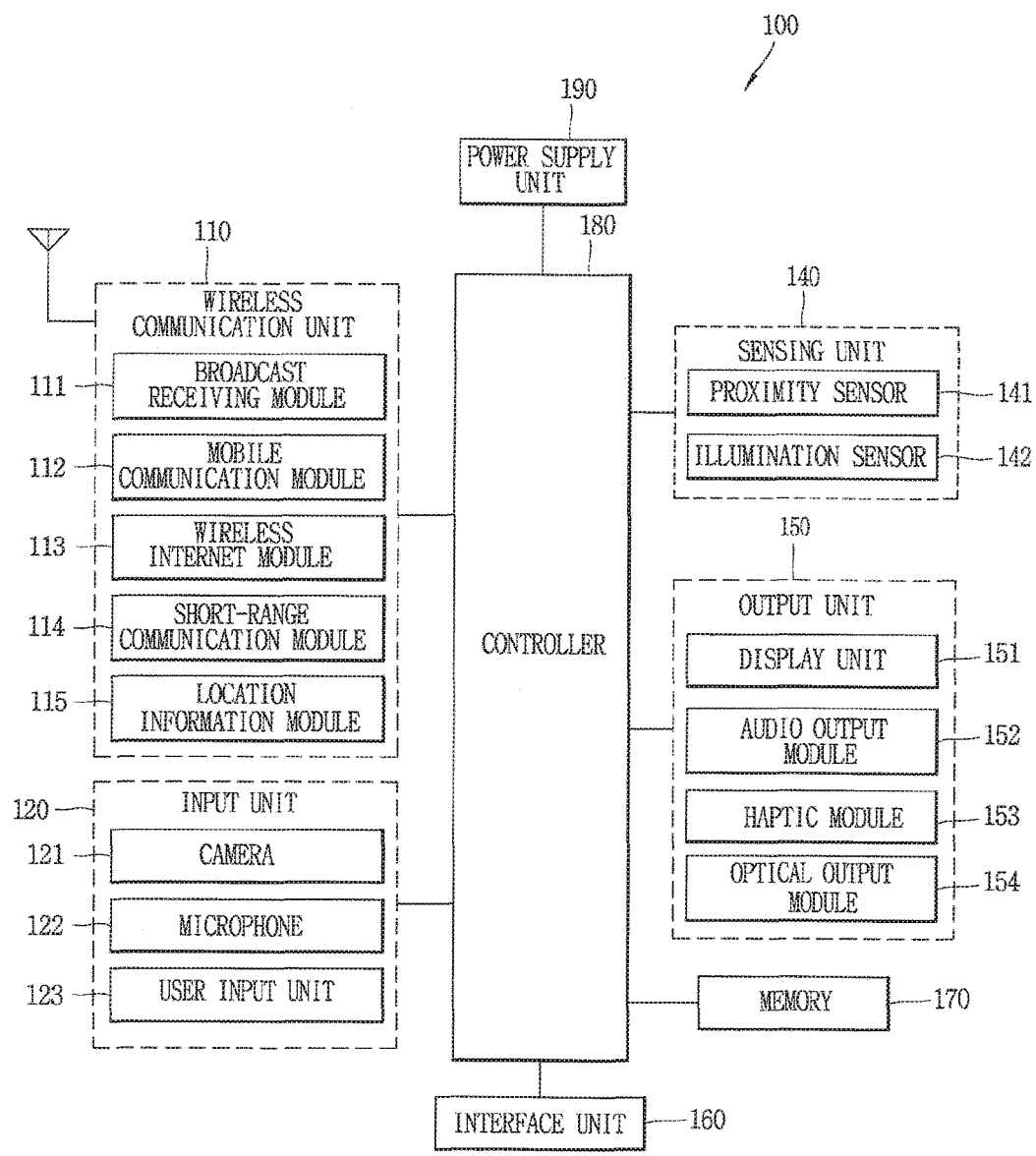
FIG. 1A is a block diagram of a mobile terminal in accordance with the present disclosure.

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings. In the following description, explanations will be made in order in the clockwise direction based on the drawing in a right upper side.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
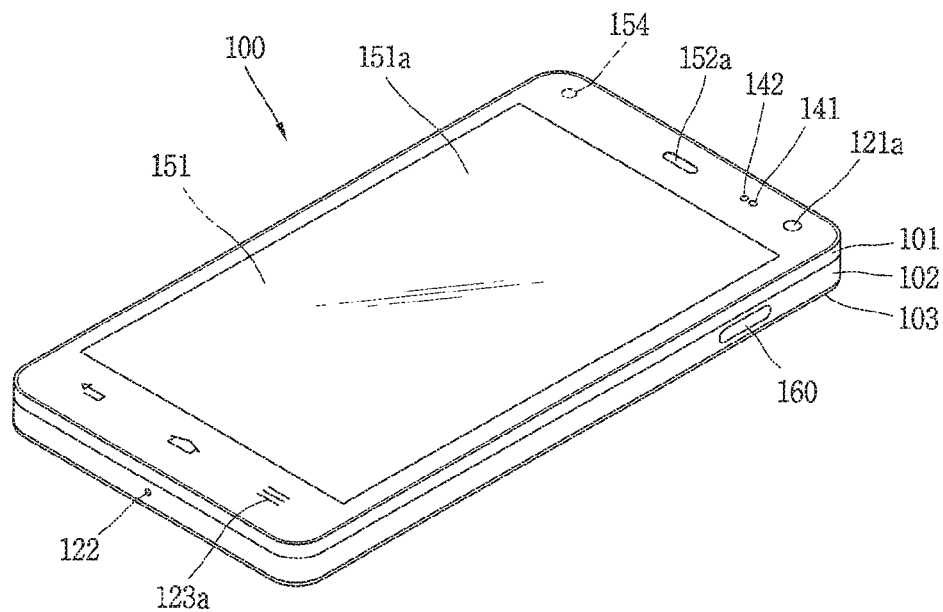
FIGS. 1B and 1C are conceptual views of one example of the mobile terminal, viewed from different directions.
Figure 1C:
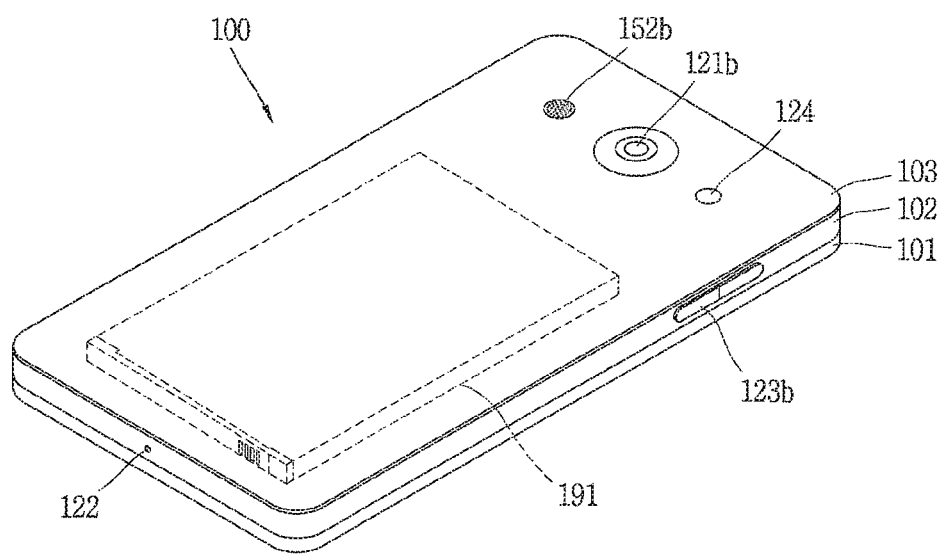
Figure 2:
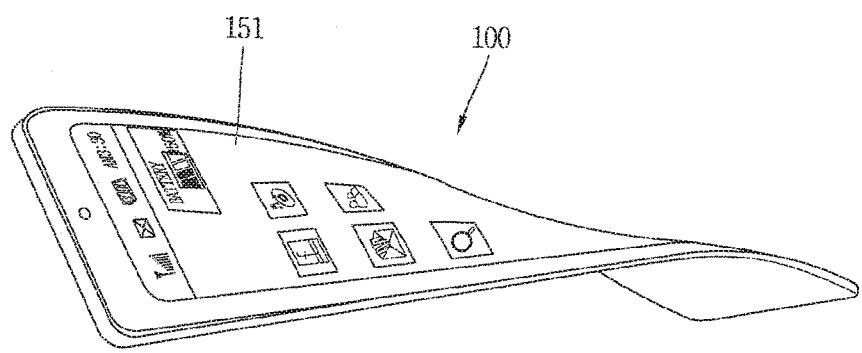
FIG. 2 is a conceptual view illustrating an embodiment of a mobile terminal employing a flexible display unit related to the present disclosure.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The electromagnetic wave generator generates electromagnetic waves having rectilinear propagation as a trigger signal for controlling an external device positioned at a short distance. Specifically, the electromagnetic wave generator generates electromagnetic waves having a specific frequency under the control of the controller 180. That is, electromagnetic waves generated by the electromagnetic wave generator may have various frequencies under the control of the controller 180. The electromagnetic waves may include various data for controlling an external device. Specifically, the electromagnetic waves may include a request message for requesting information related to an external device and an identifier for security.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor provided at the display unit 151 may be configured to sense touch input in an activated state and a deactivated state, using different methods. The different methods may be associated with an activation period of the touch sensor. More specifically, the touch sensor may be activated with a different period according to an activated state or a deactivated state of the display unit 151. That is, the touch sensor may sense a touch input applied thereon, with a different activation period, according to an activated state or a deactivated state of the display unit 151.

For instance, in a deactivated state of the display unit 151, the touch sensor may be activated with a preset period. In this case, the preset period may be a time period more than 0. On the other hand, in an activated state of the display unit 151, the touch sensor may be always operated in an activated state. In this case, an activation period of the touch sensor may be a time period of 0 or very close to 0.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. On the other hand, if a power consumption amount of the touch sensor exceeds the preset value based on '0', it may be determined that the touch sensor is in an activated state.

If the display unit 151 is in an activated state (hereinafter, will be referred to as an active mode), the touch sensor may wait for a touch input to the display unit 151, while maintaining an activated state. On the other hand, if the display unit 151 is in a deactivated state (hereinafter, will be referred to as a doze mode), the touch sensor may be activated at preset periods.

When the preset activation period of the touch sensor is shorter, a sensing speed with respect to a touch input applied onto the display unit 151 is higher. However, in this case, a power consumption amount of the touch sensor may be increased. On the other hand, when the preset activation period of the touch sensor is longer, a sensing speed with respect to a touch input applied onto the display unit 151 may be lower, while a power consumption amount of the touch sensor is decreased.

Thus, the preset period may be set so that a sensing speed with respect to taps (touch input) applied onto the display unit 151 can be high enough not to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

In a doze mode where the display unit 151 is in a deactivated state and the touch sensor is periodically activated, if a preset touch input (first and second touch inputs consecutively applied onto a predetermined region within a reference time, e.g., a 'knock-knock' touch input) is sensed by the touch sensor, the controller 180 may convert the doze mode into an activate mode where the display unit and the touch sensor are activated.

Moreover, the touch sensor may be driven at a different period according to a state of the display unit 151. For instance, the touch sensor may execute a doze mode when the display unit 151 is in a closed state, and execute an active mode when the display unit 151 is converted from a closed state to an open state.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The camera includes at least one of a first camera 121a formed on a front side of the main body of the mobile terminal and a second camera 121b formed on a rear side of the main body of the mobile terminal.

The first camera 121a processes an image frame of a still image or a video obtained by an image sensor in an image capture mode or a video call mode. The processed image frame may be displayed on the display unit 151 and stored in the memory 170.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash (not shown) is shown adjacent to the second camera 121b. When an image of a subject is captured with the second camera 121b, the flash (not shown) may illuminate the subject.

An electronic wave generating unit (not shown) may be disposed to be adjacent to the second camera 121b. When the second camera 121b is activated, the electronic wave generating unit (not shown) radiates generated electromagnetic waves.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

The audio output unit 152 may include at least one of a first audio output unit 152a and a second audio output unit 152b. The first audio output unit 152a may be implemented as a receiver transmitting a call sound to a user's ear and the second audio output unit 152b may be implemented as a loud spear outputting various alarm sound or a reproduced sound of multimedia A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The front case 101 may be configured to be transformable together with the flexible display unit 151 by an external force, taking into account characteristics of the flexible display unit 151. That is, the flexible display unit 151 is formed to be bendable or foldable together with the front case 101.

For instance, the front case 101 may be formed of a transformable material such as plastic, thin glass, fiber, thin metal (e.g., aluminum, etc.), textile and silicon, or a combination thereof.

The front case 101 may be partially formed of a dielectric material or a low conductive material, and at least part of a structure of the front case 101 may be formed of metal.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed. Meanwhile, an opening exposing the camera 121 or the audio output unit 152 outwardly may be provided on the rear cover.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may include a display unit 151, an audio output unit 152, an optical output unit 154, a second camera 121, and a microphone 122.

Figure 10:
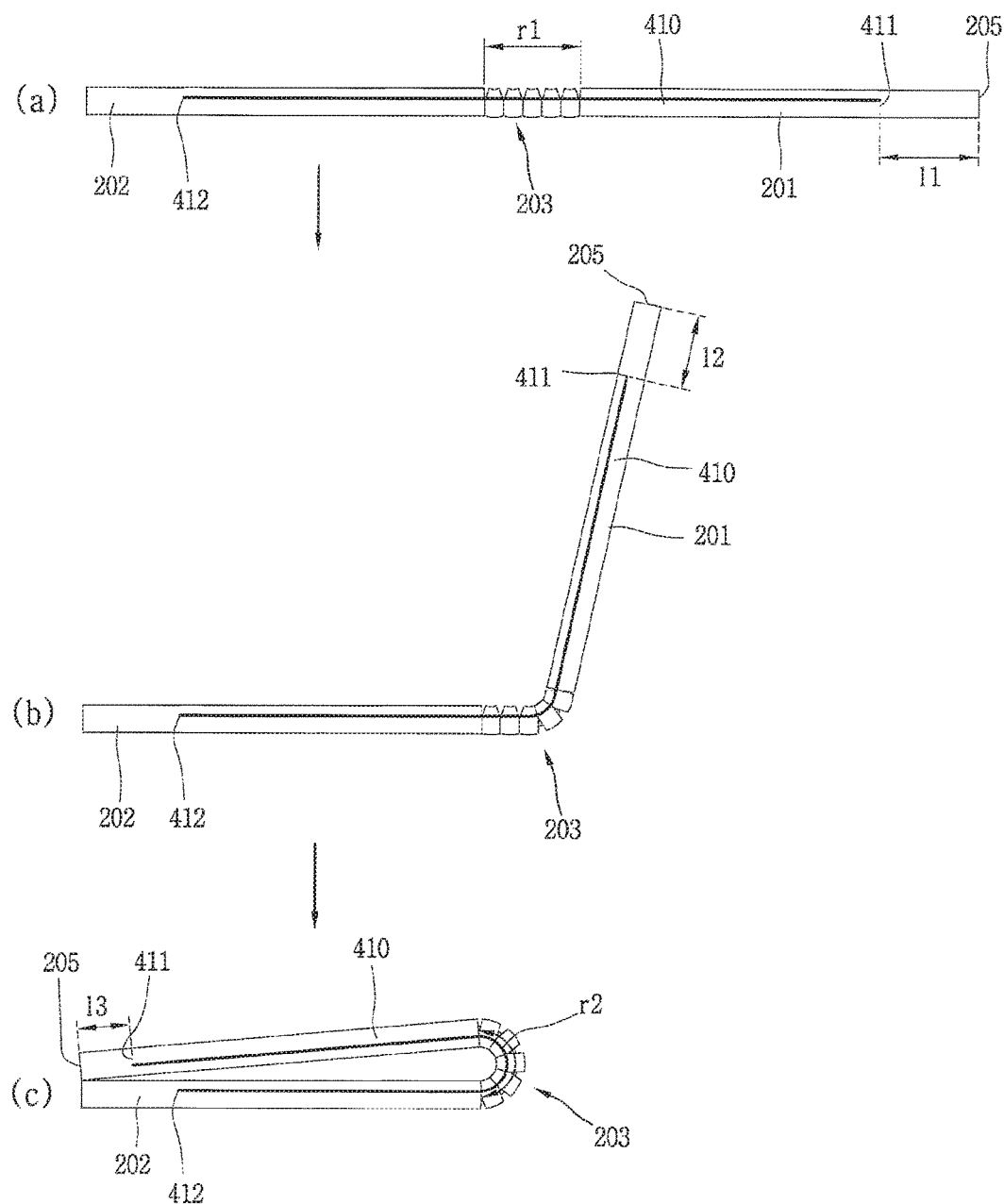
FIG. 10 is a conceptual view related to a change in a state of a main body related to the present disclosure.

Hereinafter, as illustrated in FIGS. 1B and 10, the mobile terminal 100 in which the display unit 151 is disposed on the front side of the body of the mobile terminal 100 and the camera 121, the audio output unit 152, the microphone 122, the rear input units 123*a* and 123*b*, and the optical output unit 154 are disposed on the rear side of the body of the mobile terminal 100 will be described as an example. However, the disposition of these components is not limited thereto. These components may be excluded or replaced or may be disposed on a different side as necessary.

As illustrated in FIG. 1B, the display unit 151 may be disposed on the front side of the mobile terminal 100.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

Meanwhile, the display unit 151 may be deformable by an external force. This deformation, which includes display unit 151 and other components of mobile terminal 1000, may include any of curving, bending, folding, twisting, rolling, and combinations thereof. The deformable display unit 151 may also be referred to as a "flexible display unit." In some implementations, the flexible display unit 151 may include a general flexible display, electronic paper (also known as e-paper), and combinations thereof.

The flexible display of mobile terminal 100 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 151 is not deformed (for example, in a state with an infinite radius of curvature and referred to as a first state), a display region of the flexible display unit 151 includes a generally flat surface. When in a state that the flexible display unit 151 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

When the flexible display unit 151 is not deformed (for example, in a state with an infinite radius of curvature and referred to as a first state), a display region of the flexible display unit 151 includes a generally flat surface. When the flexible display unit 151 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 151 may be a curved state (for example, a state of being curved from up to down or from right to left), instead of being in flat state. In this embodiment, when an external force is applied to the flexible display unit 151, the flexible display unit 151 may transition to the second state such that the flexible display unit is deformed into the flat state (or a less curved state) or into a more curved state.

The flexible display unit 151 may be formed of material of a plurality of layers. If desired, the flexible display unit 151 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states. The touch sensor may be arranged on a substrate of the display, or may be provided in the display.

The flexible display unit 151 may form a touch screen together with a touch sensor. In this instance, the touch screen may serve as the user input unit 123. A cause to generate a state conversion of the flexible display unit 151 is not limited to an external force. For instance, when the flexible display unit 151 is in a first state, the flexible display unit 151 may be deformed to a second state by a user's command or application command. More specifically, the mobile terminal 100 may include a driving unit. If the current condition corresponds to a preset condition, the first state may be changed into the second state by the driving unit, not by an external force.

One option is to configure the mobile terminal 100 according to an embodiment of the present invention to include a deformation sensor which senses the deforming of the flexible display unit 151. The deformation sensor may be included in the sensing unit 140.

The deformation sensor may be located in the flexible display unit 151 or the front case 101 to sense information related to the deforming of the flexible display unit 151. Examples of such information related to the deforming of the flexible display unit 151 may be a deformed direction, a deformed degree, a deformed position, a deformed amount of time, an acceleration that the deformed flexible display unit 151 is restored, and the like. Alternatively, such information may include various information sensible by bending of the flexible display unit 151.

In some embodiments, the controller 180 or other component can change information displayed on the flexible display unit 151, or generate a control signal for controlling a function of the mobile terminal 100, based on the information related to the deforming of the flexible display unit 151. Such information is typically sensed by the deformation sensor.

For instance, if the flexible display unit 151 is bent in correspondence to an external force, the controller 180 can rearrange, separate, synthesize or change a curvature of a screen image which has been displayed on the flexible display unit 151, according to a bent direction of the flexible display unit, a bent degree, and a restoration acceleration. More specifically, if the flexible display unit 151 is inward bent by an external force, the controller 180 can control screen images displayed on the flexible display unit, to be adjacent to each other. Further, if the flexible display unit 151 is outward bent by an external force, the controller 180 can control screen images displayed on the flexible display unit, to be distant from each other. The mobile terminal 100 is shown having a case 101 for accommodating the flexible display unit 151.

The mobile terminal 100 may include a case 101 for accommodating the flexible display unit 151. The case 101 may be configured to be transformable together with the flexible display unit 151 by an external force, taking into account characteristics of the flexible display unit 151. That is, the flexible display unit 151 is formed to be bendable or foldable together with the front case 101.

For instance, the front case 101 may be formed of a transformable material such as plastic, thin glass, fiber, thin metal (e.g., aluminum, etc.), textile and silicon, or a combination thereof.

The front case 101 may be partially formed of a dielectric material or a low conductive material, and at least part of a structure of the front case 101 may be formed of metal.

As shown in FIGS. 1B and 1C, as another example of the user input unit 123, one rear input unit or a plurality of rear input units 123a and 123b may be located on the rear surface of the front case 101 of the mobile terminal. The rear input units 123a and 123b can be manipulated by a user to provide input to the mobile terminal 100. The input may be used in a variety of different ways. For example, the rear input unit may be used by the user to provide an input for power on/off, start, end, scroll, control volume level being output from the audio output unit 152, switch to a touch recognition mode of the flexible display unit 151, and the like. The rear input unit may be configured to permit a touch input, a push input, or combinations thereof.

The rear input units 123a and 123b may be located to overlap the flexible display unit 151 of the front side in a thickness direction of the body of the mobile terminal. As one example, the rear input units 123a and 123b may be located on a rear surface of the mobile terminal 100 in a flat state of the front case 101. However, when the front case 101 is bent so that a left end and a right end thereof can face each other, the rear input units 123a and 123b may be located on a front surface of the mobile terminal 100. However, the present invention is not limited to this. That is, a position and the number of the rear input units may be variable.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the flexible display unit 151 or implemented in the user input units 123a and 123b. The microphone 122 is shown located at an end of the mobile terminal 100, but other locations are possible. If desired, multiple microphones may be implemented, with such an arrangement permitting the receiving of stereo sounds.

The second camera 121b is shown located at the rear side of the body of the mobile terminal. When the first camera 121a is arranged on a front surface of the body, the second camera 121b has an image capturing direction that is substantially opposite to the image capturing direction of the first camera 121a.

The first camera 121a may be arranged at an opening formed at part of the flexible display unit 151. Alternatively, the first camera 121a may be arranged at an opening formed at part of the case disposed on a front surface. The second camera 121b is configured to process an image frame of still images or moving images acquired by an image sensor in a capturing mode or a video call mode. The processed image frame may be displayed on the flexible display unit 151, and may be stored in the memory 170.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the second camera 121b, the flash 124 may illuminate the subject.

An electromagnetic wave generation unit may be disposed close to the second camera 121b. When the second camera 121b is activated, the electromagnetic wave generation unit emits generated electromagnetic waves.

At least one antenna for wireless communication may be located on the body of the mobile terminal. The antenna may be installed in the body of the mobile terminal or formed by the case. For example, an antenna which configures a part of the broadcast receiving module 111 may be retractable into the body of the mobile terminal. Alternatively, an antenna may be formed using a film attached to an inner surface of the rear cover, or a case that includes a conductive material.

A battery located in the mobile terminal 100 may also be deformable in cooperation with the flexible display unit 151, taking into account the characteristic of the flexible display unit 151. One technique to implement such a battery is to use a stack and folding method of stacking battery cells.

Further, the interface unit 160 may be disposed on a side surface of the body of the mobile terminal. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

A battery may receive power via a power source cable connected to the interface unit 160. Also, the battery can be recharged in a wireless manner using a wireless charger. Wireless charging may be implemented by magnetic induction or electromagnetic resonance.

The mobile terminal according to an embodiment of the present disclosure including at least one of the components described above may be configured as a new form factor that may be unfolded and folded to be used, like book.

Hereinafter, a structure of a mobile terminal related to a change in a shape of a flexible display unit, together with a structure of the flexible display unit, will be described in detail with reference to the accompanying drawings.

First, characteristics of outer appearance of a mobile terminal according to an embodiment of the present disclosure will be described.

Figure 3A:
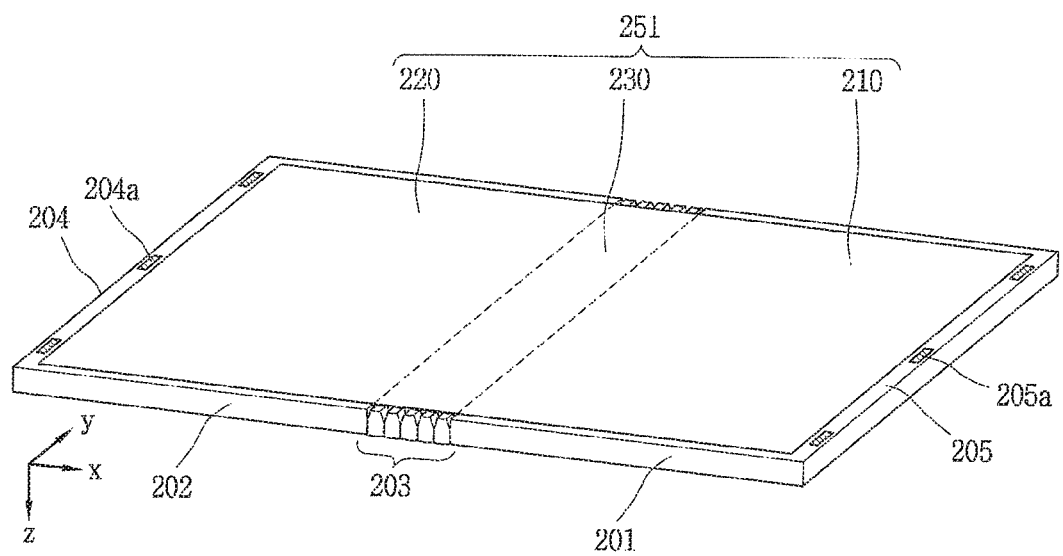
FIG. 3A is a conceptual view illustrating an example in which a display unit forms a single plane in a terminal related to the present disclosure.
Figure 3B:
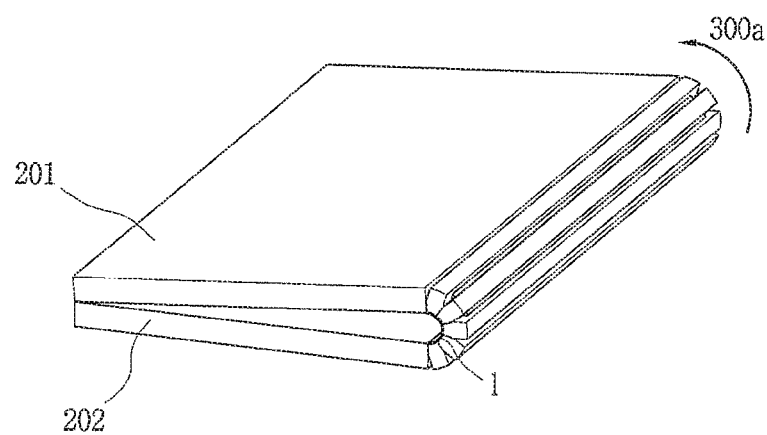
FIG. 3B is a conceptual view illustrating a state in which a folding region of the display unit is folded in the terminal illustrated in FIG. 3A.

FIG. 3A is a conceptual view illustrating an example in which a display unit forms a single plane in a terminal related to the present disclosure, and FIG. 3B is a conceptual view illustrating a state in which a folding region of the display unit is folded in the terminal illustrated in FIG. 3A.

Referring to FIGS. 3A and 3B, the terminal includes a case forming an appearance, a flexible display unit 251 disposed on a front side, and a sensing unit 140 (please refer to FIG. 1A, or a deformation sensing unit) sensing deformation of the flexible display unit 251.

The flexible display unit 251 is formed to be bendable or foldable.

Here, folding refers to a state in which a radius of curvature of a portion of a main body of the terminal is maintained to be smaller than a reference value, which corresponds to a folded state. In case of folding, screens of the display unit are in contact with each other or positioned to be close to each other.

Meanwhile, bending refers to a state in which a radius of curvature of a portion of the main body of the terminal is maintained to be greater than the reference value, which corresponds to a bent state.

Folding and bending may be differentiated according to a degree to which the main body of the terminal is bent. For example, when the main body is bent at an angle greater than a predetermined angle, a corresponding state may be defined as folding, and when the main body is bent at an angle equal to or smaller than the predetermined angle, a corresponding state may be defined as bending. Also, even though the main body is bent at an angle greater than the predetermined angle, if a radius of curvature thereof is greater than the reference value, a corresponding state may be defined as bending.

Referring to the drawings, in a state in which the flexible display unit 251 of the terminal forms a single plane, the flexible display unit 251 may be switched to a state in which at least a portion thereof is changed in shape. The state in which the shape is changed may be, for example, a state in which the flexible display unit 251 is folded. That is, the flexible display unit 251 may enter to a first state in which a specific region thereof is a plane (please refer to FIG. 3A) and a second state (FIG. 3B) in which the specific region is folded as a curved surface.

In this case, the specific region folded in the second state may be defined as a folded region 230. Referring to FIG. 3A, the flexible display unit 251 may include a first body 210 and a second body 220 demarcated by the folded region 230. In detail, the folded region 230 may be a region disposed between the first body 210 and the second body 220 in the flexible display unit 251. The first body 210 may be a region disposed on one side of the flexible display unit 251, and the second body 220 may be a region disposed on the other side of the flexible display unit 251. Thus, the folded region 230 may be a central portion, rather than an edge, of the flexible display unit 251. Also, the folded region 230 is formed to extend in one direction, and may be entirely formed to be deformed uniformly.

The main body of the terminal according to the present disclosure may be configured such that at least a portion thereof is flexible so as to be changed in state between the first state in which the main body is unfolded and the second state in which the main body is folded.

In detail, the main body may be configured to be entirely flexible such that the entirety of the main body can be deformed together with the flexible display unit 251.

Alternatively, the main body may be configured such that only a partial region thereof is flexible. Here, the flexible portion will be referred to as a folded region 203 and portions disposed on both sides of the folded region 230 will be referred to as first and second bodies 201 and 202.

That is, the folded region 230 of the main body may be a region in which the folded region 230 of the flexible display unit 251 is disposed, and the first and second bodies 201 and 202 of the main body may be regions in which the first and second bodies 210 and 220 of the flexible display unit 251 are disposed, respectively.

In a case in which only the folded region 230 of the main body is formed to be flexible, the main body may be bent or curved but the first body 201 and the second body 202 may not be flexible.

Referring to FIGS. 3A and 3B, the terminal may be formed to be folded with respect to the folded region 230.

For example, the first body 201 of the main body of the terminal may be rotated so as to be bent or deformed in a first arrow direction 300a based on the folded region 230 as an axis. In this case, the first body 201 and the second body 202 may be folded, thus implementing a foldable terminal. Here, the first and second bodies 210 and 220 of the flexible display unit 251 disposed on one surface of the main body may also be folded.

Also, in this case, the folded region 230 may be in a folded state along a curved line trace I. The curved line trace may be a portion of a circumference of a circle or a portion of a circumference of an oval.

Also, the flexible display unit 251 may have a plurality of folded regions. In this case, the left end portion and the right end portion of the terminal may b folded to provide a dual-foldable display.

As described above, the main body of the mobile terminal according to the present disclosure may be configured to be folded with respect to the folded region 230.

Meanwhile, in the present disclosure, a length direction, a width direction, and a thickness direction of the main body may be referred to as an x direction, a y direction, and a z direction, respectively.

Hereinafter, a control operation and a structural mechanism related to folding of the folded region will be described in more detail.

Figure 4:
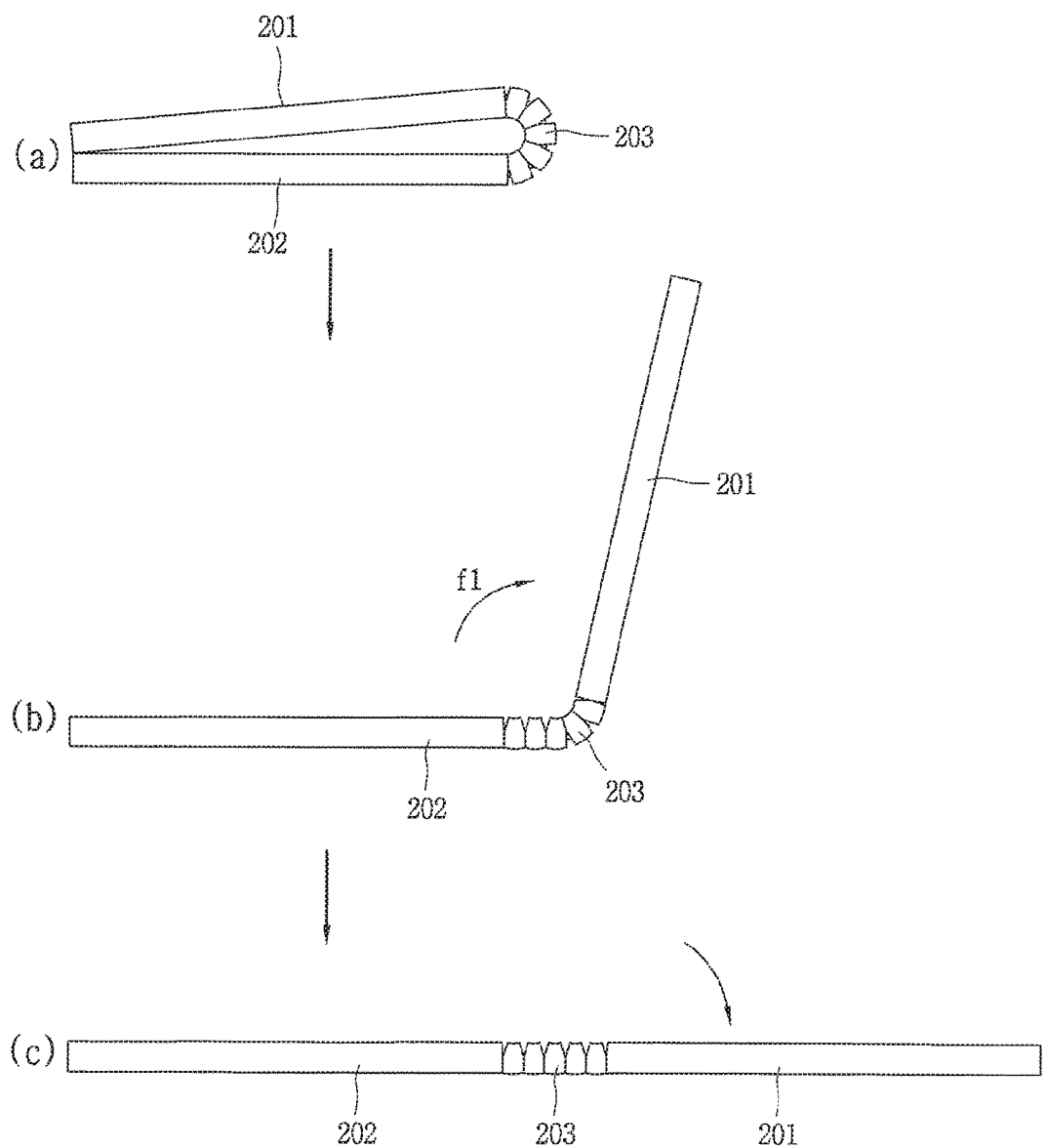
FIG. 4 is a conceptual view related to a change in a state of a main body related to the present disclosure.
Figure 5A:
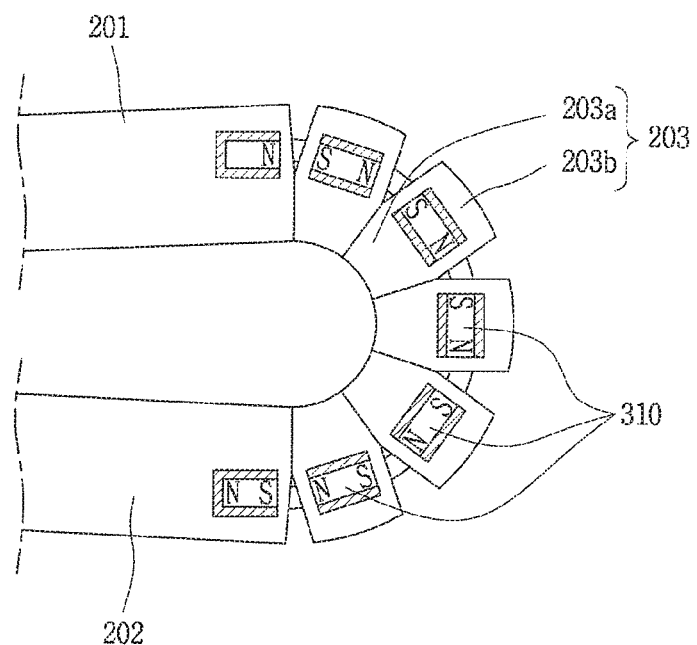
FIGS. 5A and 5B are conceptual views illustrating an operation of a folding unit according to an embodiment of the present disclosure.
Figure 5B:
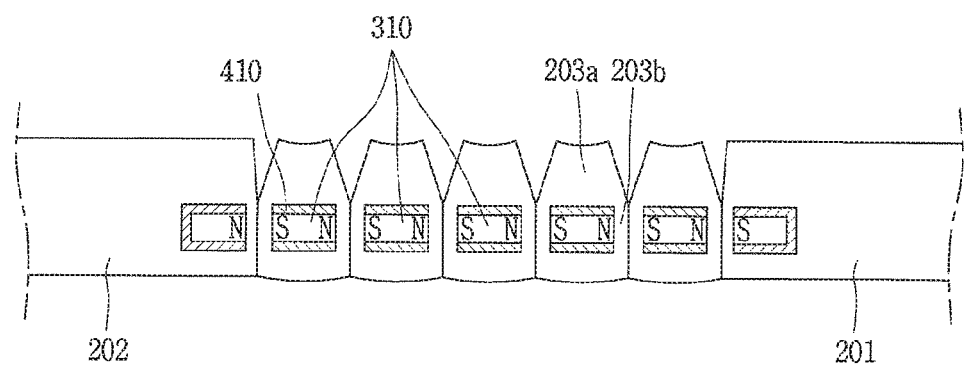
Figure 6A:
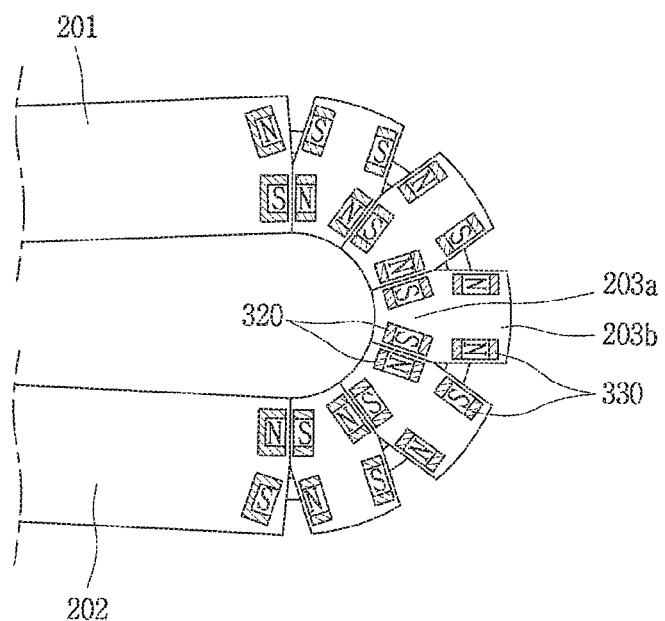
FIGS. 6A and 6B are conceptual views illustrating an operation of a folding unit according to another embodiment of the present disclosure.
Figure 6B:
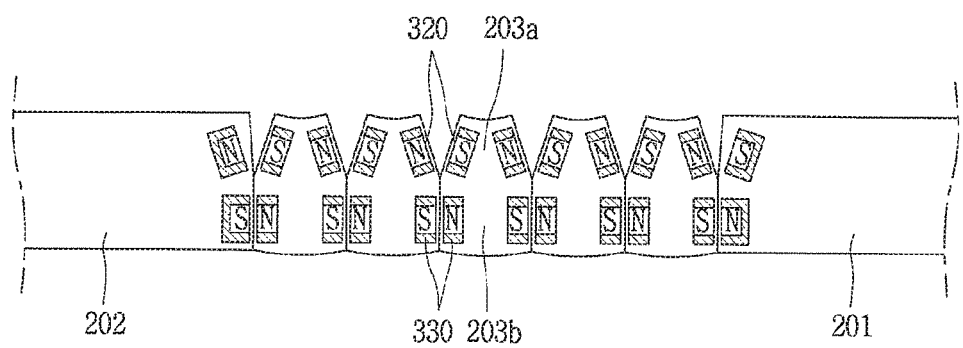
Figure 7A:
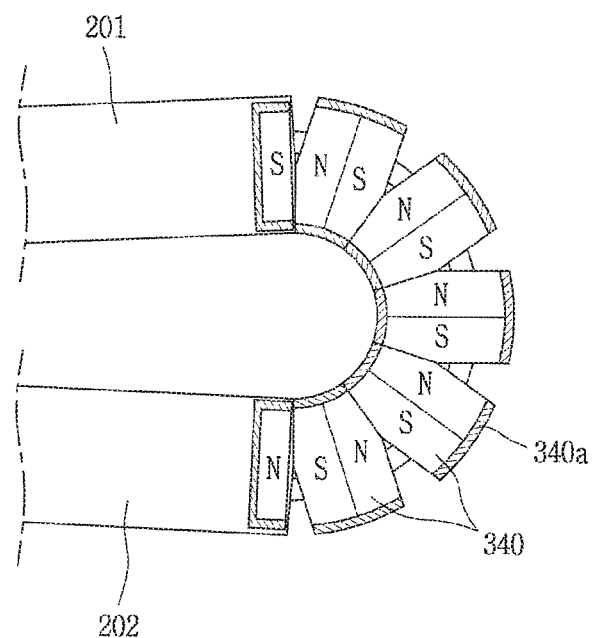
FIGS. 7A and 7B are conceptual views illustrating an operation of a folding unit according to another embodiment of the present disclosure.
Figure 7B:
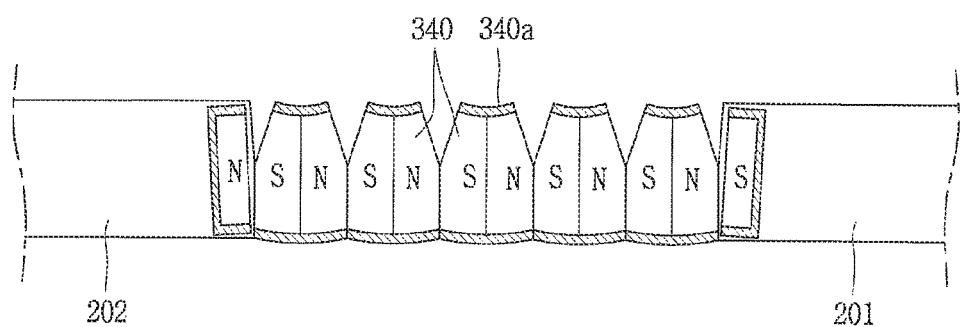

FIG. 4 is a conceptual view related to a change in a state of a main body related to the present disclosure, FIGS. 5A and 5B are conceptual views illustrating an operation of a folding unit according to an embodiment of the present disclosure, FIGS. 6A and 6B are conceptual views illustrating an operation of a folding unit according to another embodiment of the present disclosure, and FIGS. 7A and 7B are conceptual views illustrating an operation of a folding unit according to another embodiment of the present disclosure.

In FIG. 4, (a) and (c) illustrate the main body placed in the first and second states, respectively and (b) illustrates the main body placed in an intermediate state (hereinafter, referred to as a "third state") between the first and second states.

In the drawing, it is illustrated that the first and second bodies form an obtuse angle, and here, the angle formed by the first and second bodies may be a certain angle between 0 to 180 degrees.

Referring to (a) and (b) of FIG. 4, in a state in which the main body is placed in the first state, when an external force f1 is applied to the main body, the folded region of the main body is unfolded to be changed to the third state.

Referring to (b) and (c) of FIG. 4, when the main body is placed in the third state, even though the external force is not applied any longer, the main body may be changed to the third state by a folding unit installed in the main body.

In other words, in a state in which the main body is placed to be folded in the second state, when the predetermined external force f1 is applied to escape from the second state, the main body is automatically placed in the first state.

Hereinafter, an operation of the folding unit provided in the mobile terminal according to an embodiment of the present disclosure will be described in detail.

The folding unit related to the present disclosure includes a plurality of blocks 203 and a plurality of magnets 310 respectively installed in the plurality of blocks 203.

The plurality of blocks 203 may be sequentially disposed and adjacent blocks may be connected to each other.

For example, the plurality of blocks 203 may be installed in a connection part penetrating the blocks 203 so as to be connected.

Alternatively, the plurality of blocks may be connected to each other through a hinge structure. The hinge structure may be implemented such that a through hole is formed in any one of the adjacent blocks and an insertion portion to be inserted into the through hole is provided in the other of the adjacent blocks.

The plurality of blocks 203 may be formed to have spaces therebetween different in the first state and the second state. In detail, in the first state, spaces between the plurality of blocks 203 may be relatively narrow, and in the second state, spaces between the plurality of blocks 203 may be relatively wide.

In detail, each of the plurality of blocks 203 may have first and second portions 203a and 203b disposed in a thickness direction (z direction) of the main body. The first and second portions 203a and 203b may be integrally formed. Here, the first and second portions 203a and 203b may be positioned on an inner side and outer side when the folding unit is folded.

Any one 203a of the first and second portions 203a and 203b may be formed such that a space between the first portions 203a is narrowed when the first state is switched to the second state, and the other 203b of the first and second portions 203a and 203b may be formed such that a space between the second portions 203b is narrowed when the second state is switched to the first state.

In detail, the first portions 203a of the plurality of blocks may be configured to have sloped sides such that the first portions 203a come into contact with each other in the folded second state to form a predetermined curved line trace.

Also, the second portions 203b of the plurality of blocks may be formed to have sides substantially perpendicular to one surface of the main body such that the second portions 203b come into contact with each other so as to be flat in the unfolded first state.

In other words, each of the first and second portions 203a and 203b may have a sloped side different with respect to one surface of the main body in the first state. Accordingly, in the unfolded first state, the second portions 203b are in contact with each other, and in the folded second state, the first portions 203a may be in contact with each other. Through this structure, folding and unfolding of the main body may be more stably implemented.

Referring to FIGS. 5A and 5B, the plurality of magnets 310 included in the folding unit related to the present disclosure may be installed in the plurality of blocks 203, respectively, in order to apply attraction in a direction in which spaces between the plurality of blocks 203 are narrowed.

In detail, the plurality of magnets 310 may be installed to be slanted toward the second portions 203b within the plurality of blocks 203.

Thus, as illustrated in FIG. 4, in a state in which the main body is placed in the second state, even though the main body is slightly spread, the spaces between the second portions may be narrowed by attraction of the plurality of magnets 310 and the main body may be placed in the unfolded first state overall.

To sum up, the main body may be stably maintained in the unfolded first state by attraction of the plurality of magnets 310. That is, even though the main body is not placed on a flat spot (for example, even through the main body is gripped by the user), the main body may be stably maintained in the flatly spread state.

Meanwhile, referring back to FIG. 3A, at least a pair of magnets 204a and 205a may be installed on both ends 204 and 205 of the main body in order to apply attraction to the main body such that the main body can be maintained in the second state.

That is, any one 205a of the pair of magnets 204a and 205a may be installed in the end portion 205 of the first body 201 of the main body and the other 204a may be installed in the end portion 204 of the second body 202. In addition, the pair of magnets 204a and 205a may be disposed in the end portions 205 and 204 of the first and second bodies to face each other in the second state in which the main body is folded.

That is, the main body may be stably maintained in the folded second state due to attraction of the at least a pair of magnets 204a and 205a.

Meanwhile, referring to FIGS. 5A and 5B, magnets that may form attraction with the outermost magnets among the plurality of magnets may be installed also in the first and second bodies 201 and 202.

Meanwhile, the other portions excluding the sides of the plurality of magnets 310 facing each other may be shielded. That is, a non-magnetic material 410 for shielding may be formed to surround one surface of each of the plurality of magnets 310. Accordingly, a stronger magnetic force may concentrate on a portion which is not shielded (that is, portions in which the magnets face each other).

Referring to FIGS. 6A and 6B, the plurality of magnets may include first and second magnets 320 and 330.

In detail, referring to FIG. 6A, the first magnet 320 may be installed in the first portions 203a to apply attraction in a direction in which spaces between the first portions are narrowed in the folded second state.

Also, referring to FIG. 6B, the second magnets 330 may be installed in the second portions 203b to apply attraction in a direction in which spaces between the second portions are narrowed in the unfolded first state.

In other words, in the first state, a state in which the folded region is spread by attraction of the second magnets 330 may be maintained, and in the second state, a state in which the folded region is folded by attraction of the first magnets 320 may be maintained.

Meanwhile, in the present disclosure, the case in which the plurality of magnets are permanent magnets is described as an example, but the plurality of magnets may be formed of electromagnets.

Here, an electromagnet may refer to a magnet which is magnetized when a current flows and returned to the original state in which the magnet is not magnetized when the current is cut off. Also, in the electromagnet, a direction of polarity may be changed according to a direction in which current flows.

In a case in which the plurality of magnets are formed of electromagnets, the first and second magnets 320 and 330 may be alternately magnetized according to a state of the main body sensed by the sensing unit (in other words, whether the folding unit is folded or not).

In detail, when it is sensed by the sensing unit that the main body is switched from the first state to the second state, current may flow to form attraction between the first magnets 320, and current may not flow not to form attraction between the second magnets 330.

Also, when it is sensed by the sensing unit that the main body is switched from the second state to the first state, current may not flow not to form attraction between the first magnets 320, and current may flow to form attraction between the second magnets 330.

According to the operation, there is no need to continuously apply an external force to switch the first and second states, and once an initial external force for switching a state is applied, switching of the other states may be automatically performed by the operations of the plurality of magnets.

Meanwhile, referring to FIGS. 7A and 7B, the plurality of blocks may be formed of the plurality of magnets 340. In this case, the non-magnetic material 340a shielding the plurality of magnets may be disposed on an outer surface of the main body.

Figure 8:
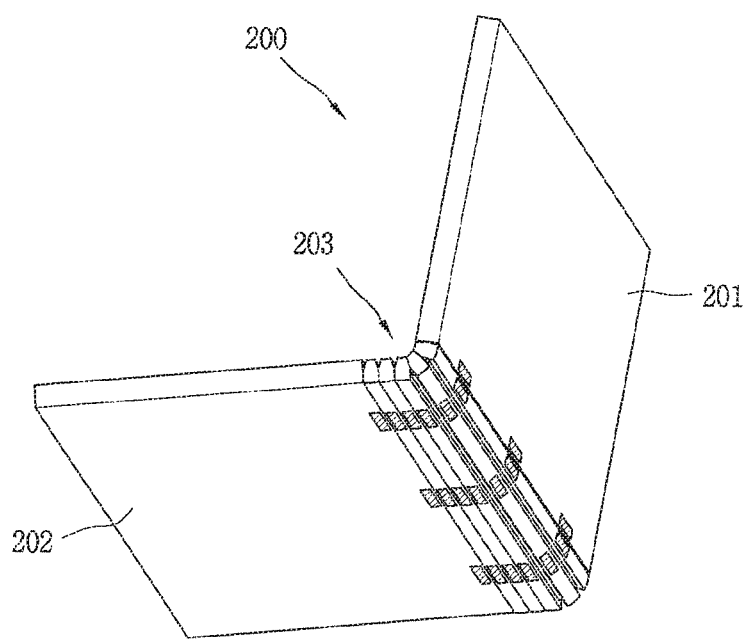
FIG. 8 is a conceptual view illustrating disposition of polarity of a plurality of magnets related to the present disclosure.
Figure 8:
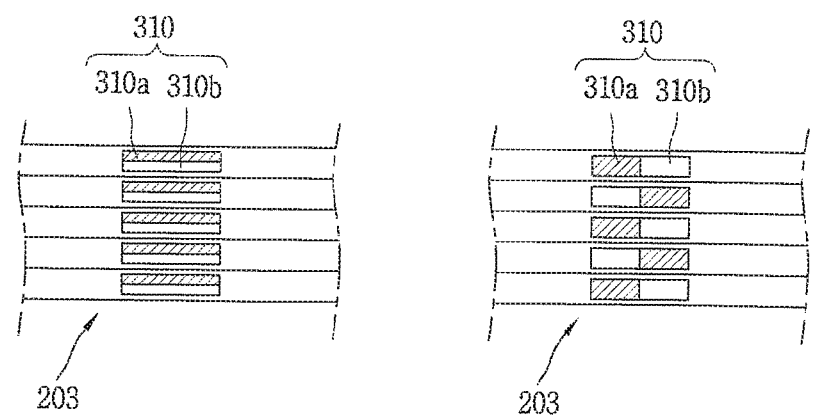

Hereinafter, disposition of polarity of the plurality of magnets 310 will be described in detail with reference to the accompanying drawings. FIG. 8 is a conceptual view illustrating disposition of polarity of a plurality of magnets related to the present disclosure.

In the present embodiment, it is assumed that the plurality of magnets are permanent magnets. Here, a portion of each of the magnets may have first polarity and the other portion thereof may have a second polarity.

Referring to a lower left side in FIG. 8, the magnet 310 may be installed on the block 203 such that a portion 310a having first polarity and a portion 310b having second polarity are disposed in a length direction of the main body within one block 203.

Alternatively, referring to lower right side in FIG. 8, the magnet 310 may be installed on the bock 203 such that a portion 310a thereof having first polarity and a portion 310b thereof having second polarity are disposed in a width direction of the main body within one block.

In both of the lower left side and lower right side in FIG. 8, the portion having the first polarity in the magnet disposed in the first block may form attraction with the portion having second polarity in the magnet disposed in the second block disposed to be adjacent to the first block.

So far, implementation of the unfolded first state by the plurality of magnets has been described. Hereinafter, implementation of the third state as an intermediate state between the first and second states will be described in detail.

Figure 9A:
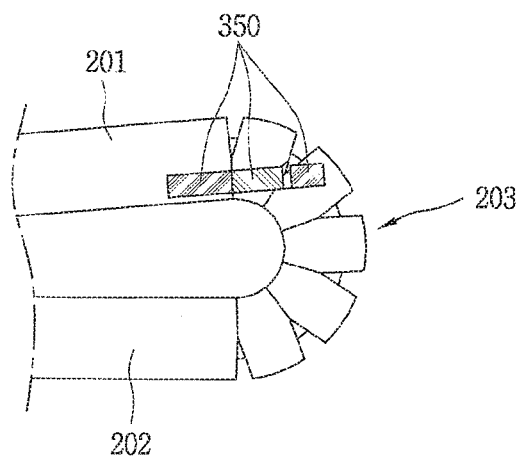
FIGS. 9A to 9C are conceptual views illustrating an operation of auxiliary magnets for implementing a third state related to the present disclosure.
Figure 9B:
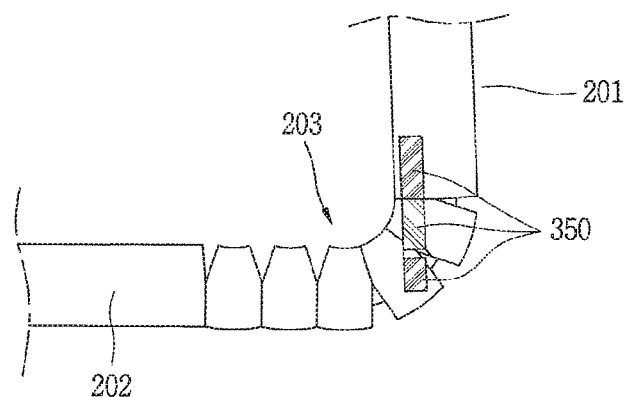
Figure 9C:
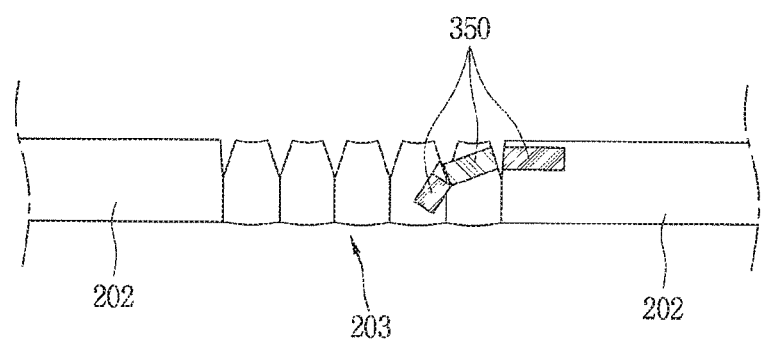

FIGS. 9A to 9C are conceptual views illustrating an operation of auxiliary magnets for implementing a third state related to the present disclosure.

FIG. 9B illustrates the main body placed in the third state. In the present embodiment, the third state may be a state in which the main body is folded at a preset angle. In other words, in the third state, the first and second bodies 201 and 202 of the main body may form a preset angle with respect to the folded region 203.

Referring to FIG. 9B, a plurality of auxiliary magnets 350 disposed aligned in the third state of the main body may be installed in at least some of the plurality of blocks.

Here, the plurality of auxiliary magnets 350 may be disposed in a different direction parallel to one direction of the main body in which the plurality of magnets 310 are arranged, whereby the plurality of auxiliary magnets 350 may not affect the plurality of magnets 310 each other.

The plurality of auxiliary magnets 350 may be configured to form attraction to each other. In detail, a magnitude of attraction formed between the plurality of auxiliary magnets 350 may be greater than a magnitude of attraction formed between the plurality of magnets 310.

According to the structure, the blocks in which the plurality of auxiliary magnets 350 are installed may be disposed to be placed in the third state, rather than in the second state.

Meanwhile, the plurality of auxiliary magnets 350 may be formed of electromagnets. In this case, an operation of the electromagnets may be controlled according to a state of the main body.

In detail, referring to FIG. 9A, in a case in which the main body is placed in the folded second state, a current may not flow in the plurality of auxiliary magnets 350. Thus, the second state may be more stably maintained due to attraction between the pair of magnets 204a and 205a installed at both ends of the main body.

Referring to FIG. 9C, in a case in which the main body is placed in the unfolded first state, a current may not flow in the plurality of auxiliary magnets 350. Thus, the first state may be more stably maintained according to attraction of the plurality of auxiliary magnets 350.

In other words, in a case in which the plurality of auxiliary magnets 350 are formed of electromagnets, when it is sensed that the main body is placed in the third state by the sensing unit, the electromagnets are operated to stably maintain the third state.

So far, various embodiments in which the main body is easily changed in size by the plurality of magnets installed in the plurality of blocks have been described. Hereinafter, embodiments in which the folding unit includes an elastic unit 410 will be described.

Figure 11A:
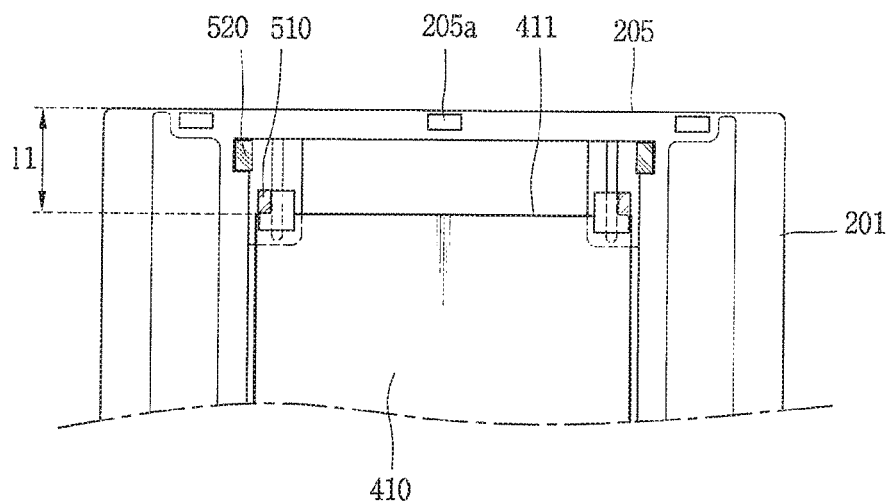
FIGS. 11A to 11C are conceptual views illustrating an operation of a folding unit according to an embodiment of the present disclosure.
Figure 11B:
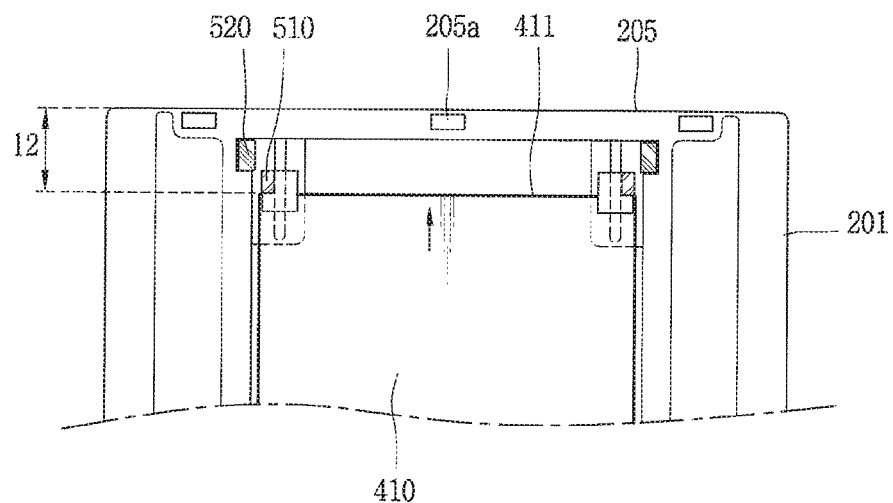
Figure 11C:
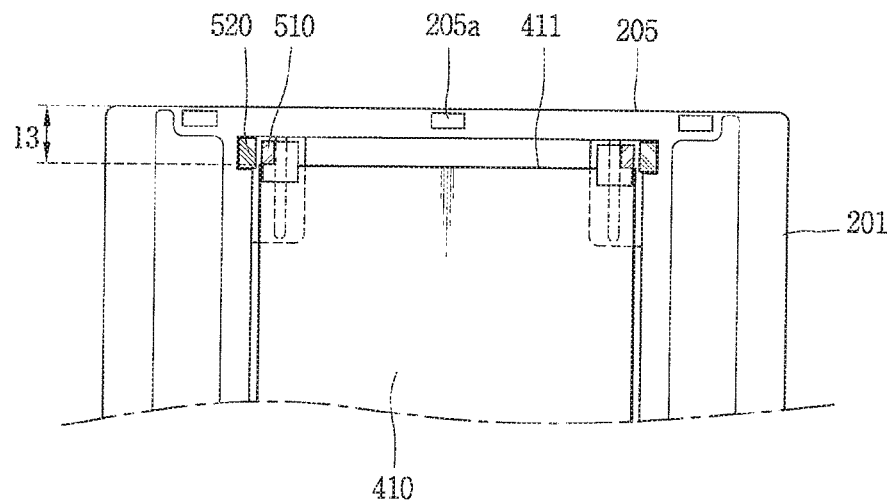
Figure 12A:
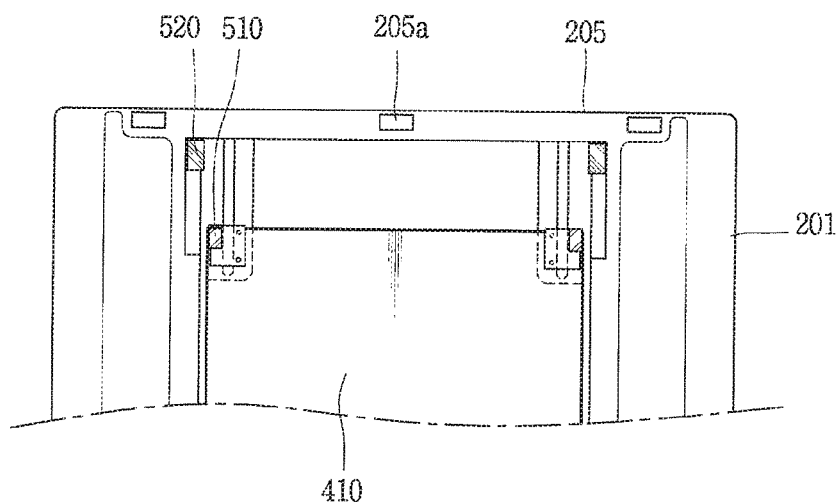
FIGS. 12A to 12D are conceptual vies illustrating an operation of a folding unit according to another embodiment of the present disclosure.
Figure 12B:
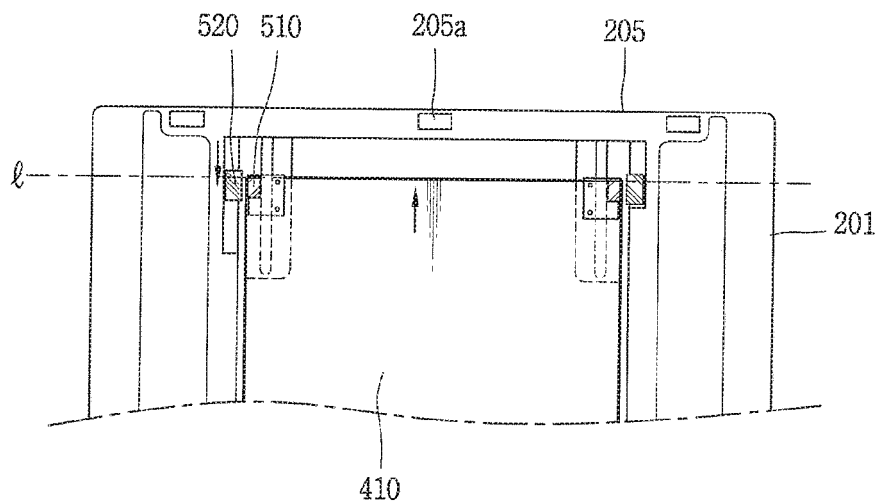
Figure 12C:
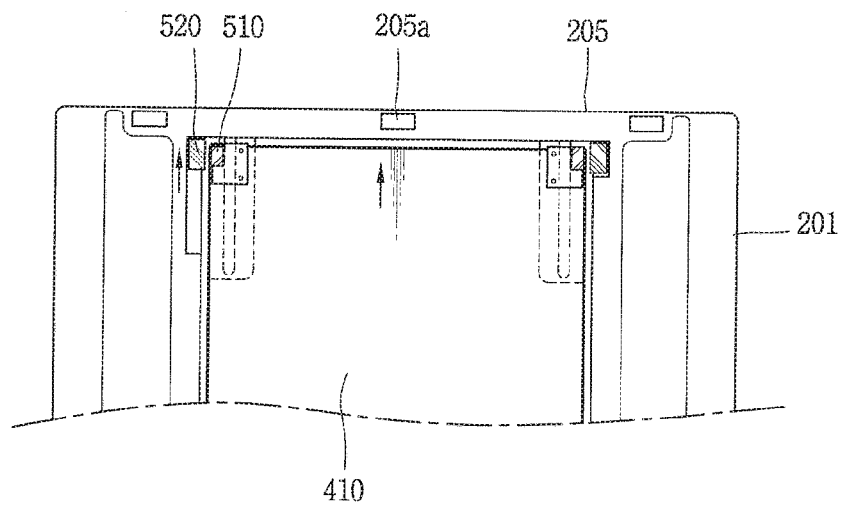
Figure 12D:
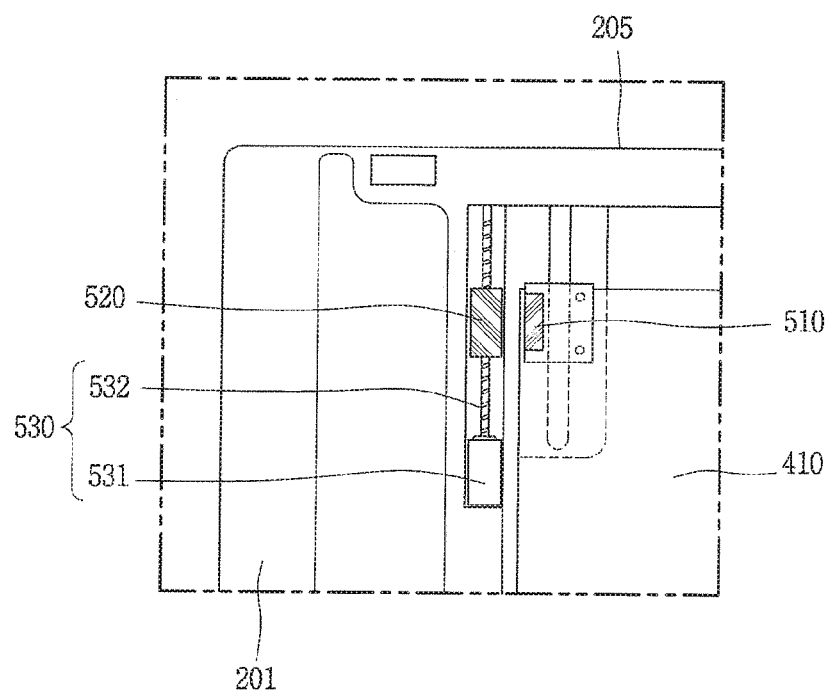
Figure 13A:
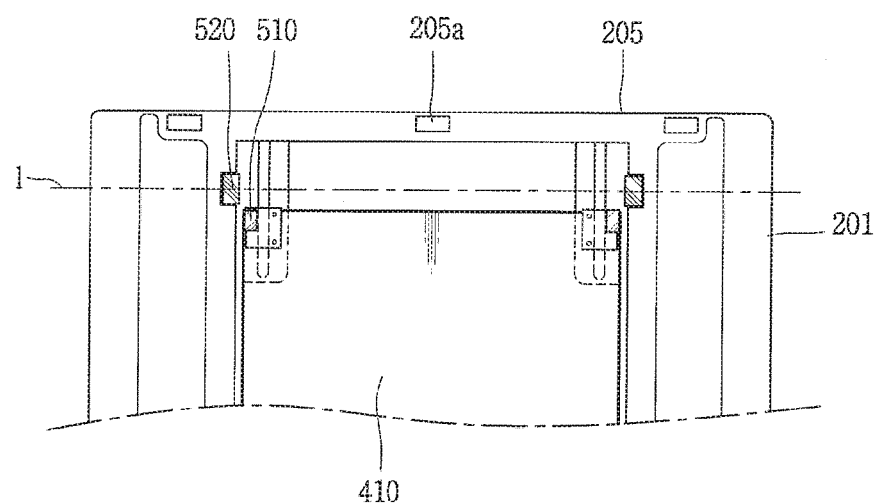
FIGS. 13A and 13B are conceptual views illustrating an operation of a folding unit according to another embodiment of the present disclosure.
Figure 13B:
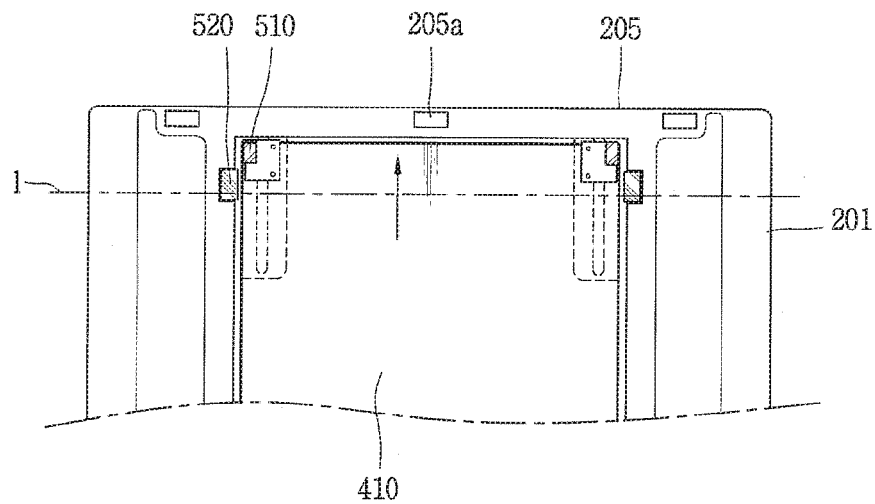

FIG. 10 is a conceptual view related to a change in a state of a main body related to the present disclosure, FIGS. 11A to 11C are conceptual views illustrating an operation of a folding unit according to an embodiment of the present disclosure, FIGS. 12A to 12D are conceptual vies illustrating an operation of a folding unit according to another embodiment of the present disclosure, and FIGS. 13A and 13B are conceptual views illustrating an operation of a folding unit according to another embodiment of the present disclosure.

(a) and (c) of FIG. 10 illustrate the main body placed in the first and second states, respectively. (b) of FIG. 10 illustrates the main body placed in an intermediate state (hereinafter referred to as a "third state").

In the drawings, it is illustrated that the first and second bodies of the main body form an obtuse angle in the third state, but an angle formed by the first and second bodies may be a certain angle between 0 and 180 degrees.

Referring to (a) and (b) of FIG. 10, when a predetermined external force is applied to the main body placed in the first state, the folded region of the main body is unfolded so as to be changed to the third state.

Referring to (b) and (c) of FIG. 10, in the third state of the main body, even though the external force is not applied any longer, the main body may be switched to the second state by the folding unit installed in the main body.

In other words, when a predetermined external force is applied to the main body placed in the unfolded first state in order to escape from the first state, the main body is automatically placed in the second state.

Hereinafter, an operation of the folding unit according to an embodiment will be described in detail.

The folding unit related to the present disclosure includes an elastic unit 410, a first magnetic force member 510, and a second magnetic force member 520 generating a magnetic force with the first magnetic force member 510.

The elastic unit 410 may be formed in a plate form and installed in the main body, so as to be folded together with the main body to generate a restoring force.

In detail, referring to FIG. 10, the elastic unit 410 may be provided within the main body. Here, the elastic unit 410 may be disposed on the main body such that it is substantially parallel to one surface of the main body.

Meanwhile, one end 411 and the other end 412 of the elastic unit 410 may be disposed in any one 201 and the other 202 among the first and second bodies. In other words, the other end 412 of the elastic unit 410 may be disposed on the opposite side of the one end 411 with respect to the folded region 203 of the main body.

Also, one end 411 of the elastic unit 410 may be formed as a free end such that a position thereof with respect to the main body is changed when a state is changed between the first and second states. Also, the other end 412 of the elastic unit 410 may be formed as a fixed end fixed to a specific position of the main body.

Meanwhile, the elastic unit 410 may be provided within the main body to penetrate through the first portions 203a of the plurality of blocks in the folded region 203.

Thus, a length of the elastic unit 410 disposed within the folded region 203 may be varied according to a state of the main body.

In detail, referring to (a) and (c) of FIG. 10, a length r2 of the elastic unit 410 placed in the folded region 203 in the second state ((c) of FIG. 10) may be shorter than a length (r1) of the elastic unit 410 placed in the folded region 203 in the first state ((a) of FIG. 10).

Thus, a distance between one end 411 of the elastic unit and one end 205 of the main body may be varied according to the state of the main body.

Referring to (a) of FIG. 10, when the main body is placed in the unfolded first state, one end 411 of the elastic unit 410 may be placed at a first distance l1 relatively distant from one end 205 of the main body.

Referring to (c) of FIG. 10, when the main body is placed in the folded second state, one end 411 of the elastic unit 410 may be placed at a second distance l3 relatively close to one end 205 of the main body.

Also, referring to (a) to (c) of FIG. 10, when the main body is placed in the unfolded second state, the main body may be placed in the third state by an external force (by a force arbitrarily applied by the user, for example) ((a)→(b) of FIG. 10).

Once the main body is placed in the third state, the main body may be automatically switched to the first state by the first and second magnetic force members (510 and 520 of FIGS. 11A to 11C) of the folding unit ((b)→(c) of FIG. 10).

Meanwhile, the third state refers to a state in which a space between the first and second magnetic force members 510 and 520 is placed within a predetermined distance.

Hereinafter, an operation of the first and second magnetic force members of the folding unit will be described in detail with reference to FIGS. 11A to 11O. FIGS. 11A to 11O illustrate states corresponding to (a) to (c) of FIG. 10, respectively.

Referring to FIGS. 11A to 11O, the first magnetic force member 510 may be installed at one end 411 of the elastic unit 410.

Also, the second magnetic force member 520 may be installed in the main body to generate magnetic force together with the first magnetic force member 510 when the main body is switched from the first state to the second state. In detail, the second magnetic force member 520 may be disposed in a position adjacent to one end 205 of the main body.

Referring to FIG. 11A, when the main body is placed in the first state, as described above, one end 411 of the elastic unit 410 may be positioned at the first distance l1 relatively distant from one end 205 of the main body.

Referring to FIGS. 11A and 11B, when the main body is switched from the first state to the third state by an external force, the one end 411 of the elastic unit 410 is placed at the second distance l2 closer to the one end 205 of the main body than the first distance l1.

Referring to FIGS. 11B and 11C, when the one end 411 of the elastic unit 410 is placed at the second distance l2 from the one end 205 of the main body, the first magnetic force member 510 is placed within influence of the second magnetic force member 520.

In other words, from this point, the one end 411 of the elastic unit 410 is pushed up in a direction toward the one end 205 of the main body due to attraction of the first and second magnetic force members 510 and 520 even without an external force separately applied by the user. Thus, the main body may be switched from the third state to the second state. Here, since attraction based on the pair of magnets 204a and 205a provided at both ends of the main body is applied to the first and second bodies 201 and 202, the main body may be easily switched to the second state.

So far, the main body that can be switched between the first and second states has been described through FIGS. 11A to 11C, but the main body may also be configured to be maintained in a state at a preset angle. This will be described in detail with reference to FIGS. 12A to 12D.

Referring to FIGS. 12A to 12D, the second magnetic force member 520 installed in the main body may be configured to be movable with respect to the main body.

In detail, the second magnetic force member 520 may be configured to reciprocate at a preset distance in a length direction of the main body.

For example, referring to FIG. 12D, the second magnetic force member 520 may be installed in a linear motor 530 provided in the main body. The linear motor 530 may be disposed to be adjacent to the elastic unit 410 in the main body.

Here, the linear motor 530 may have a rotational movement unit 531 and a linear movement unit 532 connected to the rotation movement unit 531.

The linear movement unit 532 may move forward to the one end 205 of the main body or move backward therefrom according to a rotation direction of the rotation movement unit 531. According to the linear movement unit 532, the second magnetic force member 520 may be moved in one direction of the main body.

Meanwhile, the controller related to the present disclosure may control the rotation movement unit 531 such that a movement distance of the linear movement unit 532 is adjusted according to the rotation of the rotation movement unit 531. As the movement distance of the linear movement unit 532 is adjusted, a movement distance of the second magnetic force member 520 may also be adjusted.

Referring back to FIG. 12A, when the main body is in the unfolded first state, the second magnetic force member 520 may be disposed in a first position adjacent to the one end 205 of the main body.

Referring to FIG. 12B, when a user request for maintaining the main body at a preset angle is input, the controller related to the present disclosure may control the linear motor 530 such that the second magnetic force member 520 is moved toward the opposite side of the one end 205 of the main body (or toward the folded region of the main body) so as to be disposed in a second position different from the first position. Here, the second position may be a position relatively far from one end of the main body than the first position.

In this case, since the elastic unit 410 is disposed within the main body such that the first magnetic force member 510 is aligned with the second magnetic force member 520 in the same line I of the width of the main body, and thus, the main body may be maintained at a preset angle. In other words, the first and second bodies 201 and 202 of the main body may be maintained at a preset angle centered on the folded region 203.

Meanwhile, the user request for maintaining the main body at the preset angle may be input by a touch applied to the display unit provided in the terminal.

Thereafter, referring to FIGS. 12B and 12C, when a user request for switching the main body to the second state is input, the controller may control the linear motor 530 such that the second magnetic force member 520 is moved toward the one end 205 of the main body so as to be disposed in the first position.

Here, when the second magnetic force member 520 is moved according to attraction formed between the first and second magnetic force members 510 and 520, the elastic unit 410 in which the first magnetic force member 510 is installed may also be moved toward the one end 205 of the main body together. Accordingly, the main body may be switched to the second state.

Meanwhile, the user request for switching the main body to the second state may be input by a touch applied to the display unit.

So far, the embodiments in which attraction is formed between the first and second magnetic force members 510 and 520 have been described. Hereinafter, an embodiment in which a repulsive force is formed between the first and second magnetic force members 510 and 520 will be described.

Referring to FIGS. 13A and 13B, when the first and second magnetic force members 510 and 520 come close to each other by less than a predetermined distance, they may generate a repulsive force in a direction in which they become distance from each other.

Referring to FIG. 13A, in a case in which the first magnetic force member 510 is disposed on the opposite side of the one end 205 of the main body with respect to a virtual line I on the width of the main body, a repulsive force for separating the first magnetic force member 510 as far as possible may be formed between the first and second magnetic force members 510 and 520. Accordingly, the main body may be switched to the unfolded first state.

Referring to FIG. 13B, in a case in which the first magnetic force member 510 is disposed on the same side of the one end 205 of the main body with respect to the virtual line I, a repulsive force for separating the first magnetic force member 510 from the second magnetic force member 520 may be formed between the first and second magnetic force members 510 and 520. Accordingly, the main body may be switched to the folded second state.

Meanwhile, so far, the embodiments in which one end and the other end of the elastic unit 410 are configured as a free end and a fixed end have been described. Hereinafter, embodiments in which both ends of the elastic unit 410 related to the present disclosure are configured as fixed ends will be described.

Figure 14:
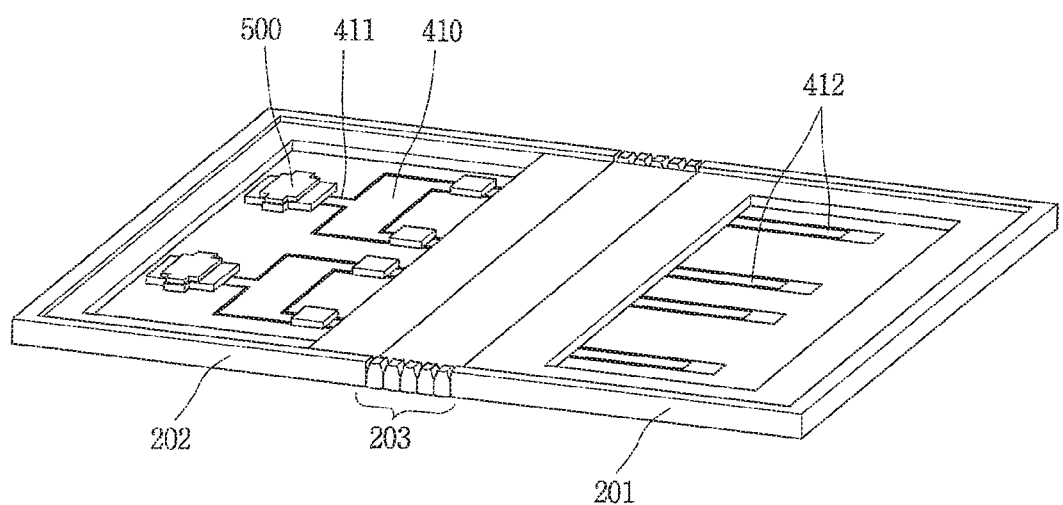
FIG. 14 is a view illustrating an elastic unit in which both ends thereof are configured as fixed ends related to the present disclosure.
Figure 15A:
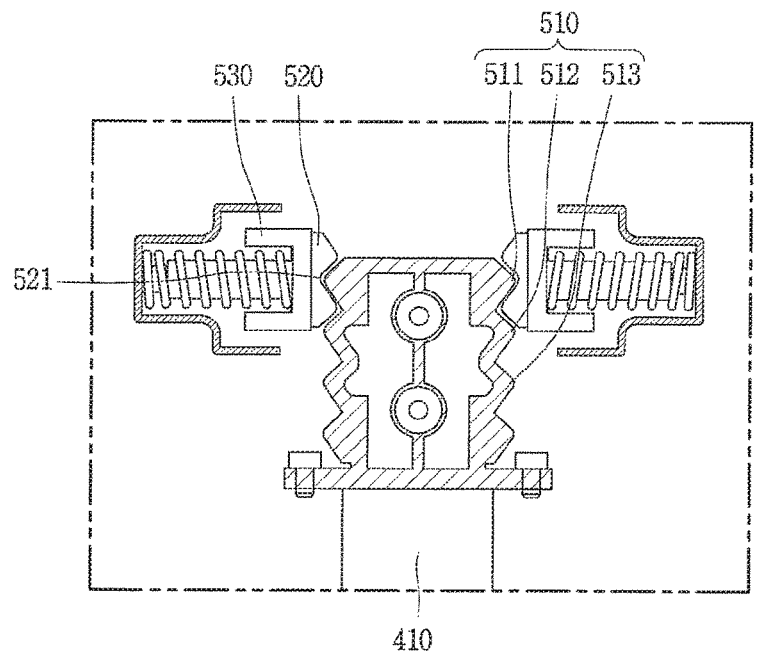
FIGS. 15A to 15C are conceptual views illustrating switching of a state of a main body according to an operation of the elastic unit.
Figure 15B:
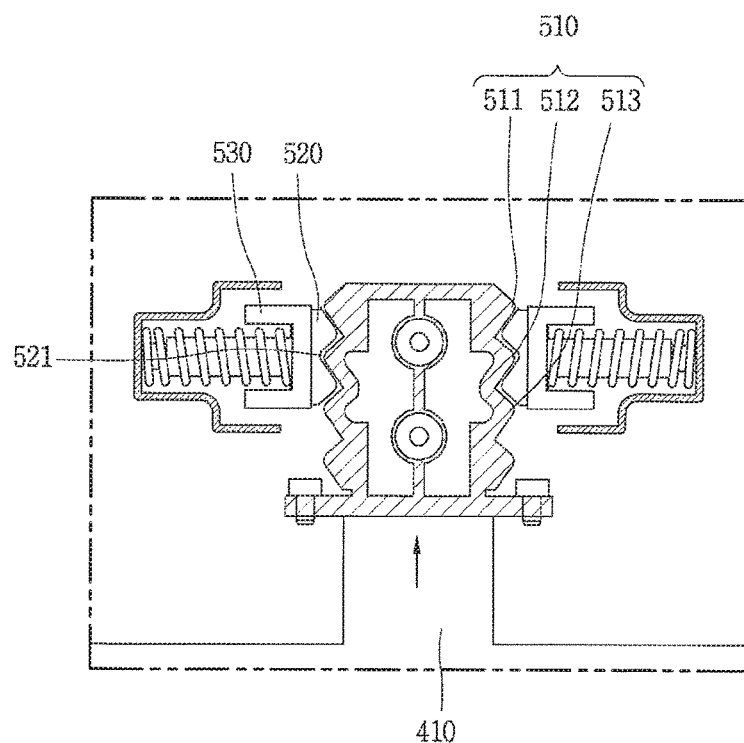
Figure 15C:
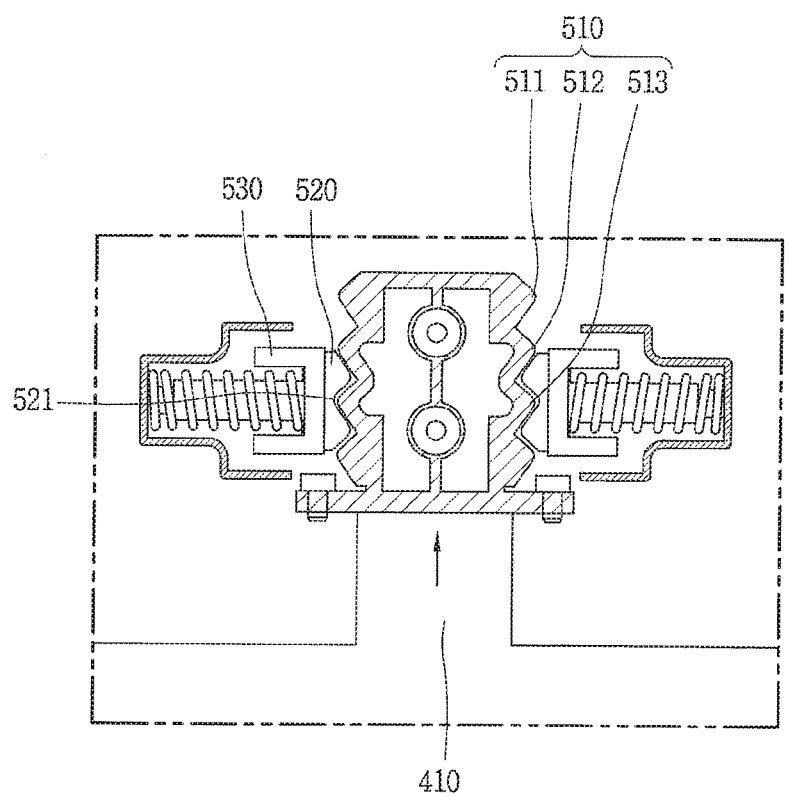

FIG. 14 is a view illustrating the elastic unit 410 in which both ends thereof are configured as fixed ends related to the present disclosure, and FIGS. 15A to 15C are conceptual views illustrating switching of a state of the main body according to an operation of the elastic unit 410.

Referring to FIG. 14, the elastic unit 410 according to the present embodiment may be provided within the main body. Here, any one 412 of both ends of the elastic unit 410 may be disposed in the first body 201 of the main body and the other 411 may be disposed in the second body 202 of the main body.

Meanwhile, a driving unit 500 for tensioning or compressing the elastic unit 410 may be connected to any one 411 of both ends of the elastic unit 410. Also, the other 412 of both ends of the elastic unit 410 may be fixed to the main body.

Hereinafter, an operation of the driving unit 500 will be described with reference to FIGS. 15A to 15C.

The driving unit may include a moving member (not shown) for moving one end of the elastic unit 410 in a length direction of the main body (or the elastic unit) and a fixing member for fixing one end of the elastic unit 410.

For example, the moving member may be implemented as a linear motor coupled to one end of the elastic unit 410.

Referring to FIGS. 15A to 15C, the fixing member may include a first member 510 coupled to one end of the elastic unit 410 and a second member 520 configured to be caught by the first member 510 and fixed to the main body.

The first member 510 may be coupled to one end of the elastic unit 410 such that the first member 510 can be moved together when the elastic unit 410 is moved. In the drawing, it is illustrated that the first member 510 and the elastic unit 410 are separately formed and fastened by a fastening unit, but the present disclosure is not limited thereto. For example, the first member 510 and the elastic unit 410 may be integrally formed.

The first member 510 may include first to third protrusion portions 511, 512, and 513 formed to be parallel to each other in a length direction of the elastic unit 410. The first to third protrusion portions may be provided on both sides of the first member, forming a pair.

The second member 520 may include a recess 521 configured to allow any one of the first to third protrusion portions 511, 512, and 513 is caught therein.

Also, a third member 530 configured to pressurize the first member 510 may be disposed on the opposite side of the portion where the recess 521 of the second member is formed. That is, the third member 530 may be formed to pressurize the first member 510 such that any one of the first to third protrusion portions 511, 512, and 513 is maintained in a state of being inserted into the recess 521 of the second member.

The states illustrated in FIGS. 15A, 15B, and 15C may correspond to the states illustrated in (c), (b), and (a) of FIG. 10, respectively. In other words, FIG. 15A illustrates a connection relationship of the elastic unit 410 and the fixing member when the main body is placed in the second state, the third state, and the first state.

Referring to FIGS. 15A and 15C, in a state in which the first protrusion portion 511 of the first member 510 is caught in the recess 521 of the second member, when one end of the elastic unit 410 is moved in one direction by the moving member, the third protrusion 513 of the first member 510 may be caught in the recess 521 of the second member. Here, the elastic unit 410 may be tensioned in a length direction of the elastic unit 410. That is, due to a tensile force applied to the elastic unit 410 by the driving unit 500, the elastic unit 410 and the main body connected to the elastic unit 410 may be unfolded, and thus, the main body may be switched from the second state to the first state.

Similarly, when one end of the elastic unit 410 is moved in the opposite direction of the one direction (FIG. 15C→FIG. 15A), the elastic unit 410 may be compressed in a length direction of the elastic unit 410. That is, due to a compressive force applied to the elastic unit 410 by the driving unit 500, the elastic unit 410 and the main body connected to the elastic unit 410 may be folded, and thus, the main body may be switched from the first state to the second state.

Referring to FIG. 15B, the second protrusion portion 512 may be formed between the first and third protrusion portions 511 and 513. When the second protrusion portion 512 is caught in the recess 521 of the second member, the elastic unit 410 and the main body connected to the elastic unit 410 may be placed in the third state as an intermediate state between the first and second states.

As described above, according to the present embodiment, the state of the main body may be easily switched according to a tensile force or a compressive force applied to the elastic unit.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a first body;
a second body; and
a folding unit coupling the first body and the second body and configured to be foldable,
wherein the folding unit comprises a plurality of blocks that are sequentially arranged, each of the plurality of blocks including a magnet for generating magnetic force when the folding unit is folded or unfolded,
wherein each of the plurality of blocks has a first portion and a second portion arranged in a thickness direction of the block such that the first portion is positioned at an inner side and the second portion is positioned at an outer side when the folding unit is folded, and
wherein spaces between second portions are narrowed or eliminated due to magnetic attraction caused by a plurality of magnets when the folding unit is unfolded, and the spaces between the second portions are widened when the folding unit is folded.

2. The mobile terminal of claim 1, wherein each of the first and second portions has a side surface having a different slope with respect to a corresponding surface of each of the first and second bodies.

3. The mobile terminal of claim 1, wherein the plurality of magnets are disposed to be slanted toward the second portion within the plurality of blocks.

4. The mobile terminal of claim 1, wherein the plurality of magnets comprise:
first magnets installed in first portions to apply attraction in a direction in which spaces between the first portions are narrowed when the folding unit is folded; and
second magnets installed in the second portions to apply attraction in a direction in which the spaces between the second portions are narrowed when the folding unit is unfolded.

5. The mobile terminal of claim 4, further comprising:
a sensing unit sensing whether the folding unit is folded,
wherein the first and second magnets are configured as electromagnets, and
wherein when the sensing unit senses that the folding unit is folded or unfolded, current flows in any one of the first and second magnets and current does not flow in the other one of the first and second magnets.

6. The mobile terminal of claim 1, wherein:
at least some of the plurality of blocks include a plurality of auxiliary magnets; and
the plurality of auxiliary magnets are disposed to be aligned in an intermediate state in which the folding unit is not completely folded or unfolded such that the first body and the second body are maintained at a preset angle in the intermediate state by the plurality of auxiliary magnets.

7. The mobile terminal of claim 6, wherein the plurality of auxiliary magnets and the plurality of magnets are arranged in different directions.

8. The mobile terminal of claim 6, further comprising:
a sensing unit sensing a posture of the first and second bodies,
wherein the plurality of auxiliary magnets are configured as electromagnets, and wherein when the sensing unit senses that the first and second bodies are placed in the intermediate state, current flows in the plurality of auxiliary magnets.

9. The mobile terminal of claim 6, wherein a magnitude of magnetic force formed between the plurality of auxiliary magnets is greater than a magnitude of magnetic force formed between the plurality of magnets.

10. A mobile terminal comprising:
a main body having at least a portion formed to be flexible such that the main body is switched between an unfolded first state and a folded second state;
a folding unit included in the main body and configured to fold or unfold the main body,
wherein the folding unit comprises:
an elastic unit having a plate form and configured to be folded with the main body to generate a restoring force when the main body is folded;
a first magnetic force member located at one end of the elastic unit; and
a second magnetic force member configured to generate magnetic force with the first magnetic force member when the main body is switched from the first state to the second state,
wherein the second magnetic force member is configured to move between a first position and a second position, and
wherein a first distance between the first position and one end of the main body is less than a second distance between the second position and the one end of the main body;
a linear motor including the second magnetic force member that is linearly movable; and
a controller configured to control the linear motor such that the second magnetic force member is moved to the second position in response to a first user request for maintaining the main body at a preset angle, the first user request received in a state in which the second magnetic force member is placed at a first position.

11. The mobile terminal of claim 10, wherein:
one end of the elastic unit is configured as a free end such that a position of the free end with respect to the main body is changed when the main body is switched between the first state and the second state; and
the other end of the elastic unit is located at an opposite side of the one end with respect to a folded portion of the main body and the other end is fixed to a specific position of the main body.

12. The mobile terminal of claim 10, wherein:
the main body includes a plurality of blocks forming a folded region of the main body;
each of the plurality of blocks has a first portion and a second portion disposed in a thickness direction of the main body; and
any one of the first and second portions is formed such that a space therebetween is narrowed when the main body is switched from the first state to the second state, and the other one of the first and second portions is formed such that a space therebetween is narrowed when the main body is switched from the second state to the first state.

13. The mobile terminal of claim 12, wherein the elastic unit is disposed on the main body to penetrate through first portions of the plurality of blocks.

14. The mobile terminal of claim 10, wherein the controller is further configured to control the linear motor such that the second magnetic force member is moved to the first position in response to a second user request for switching the main body to the second state.

15. The mobile terminal of claim 10, further comprising at least a pair of magnets applying magnetic attraction to the main body to maintain the main body in the second state, the at least a pair of magnets located at both ends of one surface of the main body.

* * * * *